United States Patent Office 3,058,165
Patented Oct. 16, 1962

3,058,165
METHOD OF MANUFACTURING ARTICLES FROM REINFORCED SYNTHETIC RESIN
Matthew Kenneth Purvis, Southampton, England. (14 Priory Road, Keynsham, near Bristol, Gloucestershire, England)
No Drawing. Filed Nov. 2, 1954, Ser. No. 466,449
Claims priority, application Great Britain Nov. 12, 1953
4 Claims. (Cl. 18—55)

The present invention relates to an improved process for the manufacturing of articles from reinforced synthetic resin material.

Known reinforced synthetic resin materials consist essentially of a synthetic resin with fibre reinforcement, the latter being in the form of one or more layers of chopped fibres, fibre mat or woven or felted fibre cloth. In order to make shaped articles from the known reinforced synthetic resin materials it is necessary to employ highly finished moulds. The necessity for such moulds, which are expensive to make and operate, makes it economically impracticable to mass-produce articles made from reinforced synthetic resin materials.

The object of the present invention is a process for manufacturing articles from reinforced synthetic resin material, which process dispenses with the necessity for conventional moulds.

According to the invention a process for manufacturing articles from reinforced synthetic resin material comprises the steps of shaping a fibrous reinforcing material and a filamentary or foraminous supporting structure therefor substantially to the shape of the article to be manufactured, the said supporting structure being made at least mainly of metal and being deformable but having considerably greater rigidity than the fibrous reinforcing material, impregnating the reinforcing material with a thermosetting or thermoplastic synthetic resin either before, during or after the shaping step, pressing the resin-impregnated fibrous reinforcing material to the shape of the article to be manufactured, and effecting setting of synthetic resin.

In the hitherto known reinforced synthetic resin materials the reinforcing material has consisted of glass, asbestos, cotton, wool, silk, flax, hemp, ramie, wood, cellulose, nylon, viscose rayon, terylene, polyacrylonitrile, or polyvinyl chloride, which materials have been employed as thin fibres or rovings either chopped into short lengths or formed into mats or woven or felted cloth. In the forms in which they are used for reinforcing synthetic resin these materials by themselves have insufficient rigidity to retain a shape which is imparted to them and in order to use these materials in the process according to the present invention it is necessary to use them in conjunction with the said supporting structure which is capable of holding the reinforcing material in the desired position while the synthetic resin hardens.

The supporting structures employed in the process according to the invention may be of a filamentary or foraminous nature. It may be made from wire in the form of strands, mesh, gauze or netting, or may be made from perforated foil, sheet or plate.

The fibrous reinforcing material may be secured to supporting structures of this first group in any of several ways. For example, reinforcing material in the form of chopped fibres or rovings, felted or woven fibres, or fibre mat, may be secured to one side, or both sides, of the supporting structure with a suitable adhesive, by sewing, or by means of loops or clips of metal or other suitable material. Again chopped fibres of the reinforcing material may be blown on to the supporting structure using compressed air. In this case the synthetic resin may be sprayed on at the same time or it may be applied to the reinforcing material after the latter has been blown on to the supporting structure.

Again the supporting structure may comprise wire which is laid into, or woven with, the fibrous reinforcing material. Thus in the case where asbestos is to be used as the reinforcing material, a cloth may be woven using wire warps and wefts of asbestos fibre. Alternatively, the warps may be of asbestos fibre and the wefts of wire. Again a proportion of both the warps and wefts may be of wire and the remainder of asbestos fibre. Again a combined reinforcing material and supporting structure therefor may be formed by weaving a cloth from a material consisting of a core wire around which fibres of the reinforcing material, for example glass fibres, are wrapped or wound. Again, a combined reinforcing material and supporting structure therefor may be formed by threading or laying wire or wire coated with thermoplastic synthetic resin, in a mat of reinforcing material, for example a glass or asbestos fibre mat, or by threading such wires through a woven or felted cloth of reinforcing material. Preferably the wires are threaded through, or laid in, the reinforcing material in two directions at an angle to one another, for example at right angles, to impart rigidity to the material in two directions.

The combined supporting structure and reinforcing material is shaped to the desired contour either manually or in a press. Impregnation and/or coating of the reinforcing material with synthetic resin may take place before, during or after the shaping process.

The reinforcing material may be arranged in one or more layers. For example, a plurality of layers of the reinforcing material may be alternated with layers of the supporting structure. Where multiple layers of reinforcing material are used, the layers may be held together by means of nuts and bolts or suitable clips, loops, tags or the like secured to the supporting structure or supporting structures.

Prior to impregnation and/or coating with synthetic resin, the reinforcing material and supporting structure therefor may be associated with structural members such as rods, tubes, girders and the like which are to form a part of the finished article. The supporting structure may also be employed to support items such as studs and shafts which are to project from the finished article.

The synthetic resin used to impregnate and/or coat the reinforcing material may be a thermoplastic synthetic resin or a thermosetting synthetic resin. In the latter case the thermosetting resin may be of the cold or hot setting type, and may be used in any commercially known liquid form, either uncured or pre-gelled. The synthetic resin may be applied by spraying, brushing, pouring, or by dipping the reinforcing material in the resin. If necessary the resin may be consolidated after application by rolling or pressing. In the case of thermosetting resins which require heat for the setting process, the heat may be applied in a suitable enclosed chamber, which can be of a temporary or permanent nature according to the article being manufactured. The heat may be derived from irons, electric heating elements, steam pipes or hot air jets, but I prefer to employ infra red radiation from electric lamps or gas radiators. Infra red radiation is highly effective since the metal of the supporting structure absorbs the infra red heat and considerably reduces the setting time of the resin. Further reduction of the setting time of the resin may be achieved by mixing a good heat conducting material, such as metal powder, in the resin.

Another way of heating the synthetic resin is to pass an electric current through the metallic supporting structure.

High frequency electrical induction heating may also be used for setting the resin.

An advantage of the process according to the invention is that a stock of partly cured resin-impregnated sheets can be maintained, the temperature conditions being adjusted so that final setting of the resin does not occur. These sheets can then be taken out of storage and used as and when required.

The process according to the invention is particularly suitable for the mass production of articles, for example parts of motor car bodies. In the application of the process according to the invention to the mass production of articles a number of flat sheets of the supporting structure combined with the reinforcing material, for example cloth woven from asbestos fibres and wire, would be cut to the developed shape of the finished article and these cut sheets would be fed to a low pressure press were they would be stamped to the shape of the article to be made. This press need be only of very light construction, for example the press dies could be made of wood. The shaped sheets would then be placed on a conveyor and led through a chamber in which they would be sprayed with a hot setting thermosetting synthetic resin from a battery of spraying nozzles. Upon leaving the resin impregnation and/or coating chamber the shaped sheets would pass to a further light press where they would be pressed to ensure adequate consolidation of the resin. Finally the shaped sheets would be passed by a second conveyor through a heated chamber to set the resin. In cases where a good exterior finish was required, pre-moulded rubber or papier-mâché masks would be placed on the shaped sheets before the second pressing operation.

In an alternative process for the mass-production of articles, flat sheets of the combined supporting structure and reinforcing material would be cut to the developed shape of the finished article and would then be thoroughly impregnated and/or coated with a hot setting thermosetting synthetic resin. This impregnation and/or coating of the sheets could be effected by immersing them in a shallow bath of the resin. The impregnated and/or coated sheets would then be passed through a low pressure chamber where surplus resin would drain away and de-aeration of the sheets would be ensured. From this low pressure chamber the sheets would be passed through a heated chamber, the time of passage of the sheets through this chamber being such that the resin would be partially set when the sheets left the heating chamber.

The partly set resin sheets would then pass to a light press where they would be stamped to the desired shape. From this press the shaped sheets would pass through a second heating chamber, for final setting of the resin.

I claim:

1. A process of manufacturing articles from reinforced synthetic resin comprising the steps of shaping a sheet of fibrous reinforcing material and a filamentary supporting structure therefor substantially to the contours of the article to be manufactured, said supporting structure being made at least mainly of metal and being deformable and capable of retaining the shape to which it is deformed; impregnating said fibrous reinforcing material with a liquid, hardenable synthetic resin; pressing the resin-impregnated sheet in a mold to the shape of the article to be manufactured; removing the thus shaped resin-impregnated sheet from said mold while said resin is still in unhardened condition; and causing said resin to harden while said article is self-supporting due to said supporting structure thereof.

2. A process of manufacturing articles from reinforced synthetic resin as defined in claim 1, wherein said liquid, hardenable synthetic resin is a thermosetting synthetic resin.

3. A process of manufacturing articles from reinforced synthetic resin as defined in claim 1, wherein the resin-impregnated sheet and supporting structure therefor is cut substantially to the developed shape of the article to be manufactured and only partial setting of the synthetic resin is effected prior to said pressing of the resin-impregnated sheet in a mold.

4. A process of manufacturing articles from reinforced synthetic resin as defined in claim 1, wherein said supporting structure is a foraminous supporting structure.

References Cited in the file of this patent

UNITED STATES PATENTS

| | | |
|---|---|---|
| 1,019,407 | Baekeland | Mar. 5, 1912 |
| 1,601,911 | Godfrey | Oct. 5, 1926 |
| 1,606,680 | Wisner | Nov. 9, 1926 |
| 1,960,120 | Mohring | May 22, 1934 |
| 1,982,689 | Polydoroff | Dec. 4, 1934 |
| 2,123,275 | Dym | July 12, 1938 |
| 2,190,807 | Steinberger | Feb. 20, 1940 |
| 2,276,035 | Guhl | Mar. 10, 1942 |
| 2,285,967 | Hardy | June 9, 1942 |
| 2,349,549 | Hardman et al. | May 23, 1944 |
| 2,417,586 | Crosley | Mar. 18, 1947 |
| 2,596,162 | Muskat | May 13, 1952 |
| 2,596,184 | Sutton | May 13, 1952 |
| 2,613,397 | Borkland | Oct. 14, 1952 |
| 2,631,955 | Muskat | Mar. 17, 1953 |
| 2,633,605 | Brucker | Apr. 7, 1953 |
| 2,746,049 | Hudson | May 22, 1956 |
| 2,766,453 | Frieder et al. | Oct. 16, 1956 |
| 2,770,026 | Petersilie et al. | Nov. 13, 1956 |

FOREIGN PATENTS

| | | |
|---|---|---|
| 128,277 | Australia | July 12, 1948 |

OTHER REFERENCES

Modern Plastics, December 1950, p. 92.
Modern Plastics, April 1952, p. 99.